United States Patent
Arvidsson et al.

(10) Patent No.: US 9,363,786 B2
(45) Date of Patent: Jun. 7, 2016

(54) TRACKING USER TERMINALS IN A MOBILE COMMUNICATION NETWORK

(75) Inventors: Ake Arvidsson, Solna (SE); Daniel Gillblad, Akersberga (SE); Per Kreuger, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 176 days.

(21) Appl. No.: 14/125,896

(22) PCT Filed: Jun. 17, 2011

(86) PCT No.: PCT/EP2011/060090
§ 371 (c)(1),
(2), (4) Date: Dec. 12, 2013

(87) PCT Pub. No.: WO2012/171574
PCT Pub. Date: Dec. 20, 2012

(65) Prior Publication Data
US 2014/0113666 A1    Apr. 24, 2014

(51) Int. Cl.
*H04W 68/00* (2009.01)
*H04W 68/02* (2009.01)
*H04W 64/00* (2009.01)

(52) U.S. Cl.
CPC .............. *H04W 68/02* (2013.01); *H04W 64/00* (2013.01); *H04W 68/00* (2013.01)

(58) Field of Classification Search
CPC . H04W 68/00; H04W 68/02; H04W 52/0254; H04W 60/04; H04W 52/0225; H04W 68/025; H04W 88/06; H04W 68/08; H04W 76/04; H04W 68/005; H04W 68/04; H04W 68/12; H04W 76/023; H04W 88/02; H04H 20/93; H04H 60/52; H04H 60/80; H04M 1/253; H04M 1/274516; H04M 1/72547; H04M 1/57; H04L 12/189; H04L 12/1895; H04L 63/12; H04L 29/06027; H04L 29/12273; H04L 5/001; H04L 5/003
USPC .................................. 455/422.1, 432.1, 435.1
See application file for complete search history.

(56) References Cited

U.S. PATENT DOCUMENTS

| 5,875,400 A | 2/1999 | Madhavapeddy et al. |
| 7,787,889 B1 * | 8/2010 | Patini ........................ 455/456.1 |

(Continued)

FOREIGN PATENT DOCUMENTS

| EP | 2525614 | 11/2012 |
| WO | WO-97/03529 | 1/1997 |

(Continued)

OTHER PUBLICATIONS

PCT Notification of Transmittal of the International Search Report and the Written Opinion of the International Searching Authority for PCT Counterpart Application No. PCT/EP2011/060090, (Apr. 5, 2012), 9 pages.

(Continued)

*Primary Examiner* — Nimesh Patel
(74) *Attorney, Agent, or Firm* — Nicholson De Vos Webster & Elliott LLP

(57) ABSTRACT

A method of tracking user terminals in a mobile communication network includes, at a tracking node, determining that a user terminal is located in a first tracking area, storing data associated with the first tracking area, the data comprising a number of observations of all user terminals at the first tracking area at a first time, receiving a page response from the user terminal located in one of the first tracking area and a second tracking area, and in an event that the user terminal remains located at the first tracking area, updating the data to include a number of page responses received at the first tracking area after a first time interval, and in an event that the user terminal is located at the second tracking area, updating the data to include a number of page responses received at the second tracking area after the first time interval.

20 Claims, 10 Drawing Sheets

(56) References Cited

U.S. PATENT DOCUMENTS

| | | | |
|---|---|---|---|
| 2002/0187793 | A1 | 12/2002 | Papadimitriou et al. |
| 2008/0220782 | A1* | 9/2008 | Wang et al. .................... 455/436 |
| 2010/0075698 | A1* | 3/2010 | Rune et al. .................... 455/458 |

FOREIGN PATENT DOCUMENTS

| | | |
|---|---|---|
| WO | WO-2010/071545 | 6/2010 |
| WO | WO-2012/050491 | 4/2012 |
| WO | WO-2012/050492 | 4/2012 |

OTHER PUBLICATIONS

Akyildiz, et al., "Movement-based location update and selective paging for PCS networks", *Networking, IEEE/ACM Transactions on (vol. 4, Issue: 4)*, (Aug. 1996), pp. 629-638.

Cayirci, et al., "Optimal location area design to minimize registration signaling traffic in wireless systems", *Mobile Computing, IEEE Transactions on . . . (vol. 2, Issue: 1)*, (Jan.-Mar. 2003), pp. 76-85.

Naor, et al., "Minimizing the wireless cost of tracking mobile users: an adaptive threshold scheme", *INFOCOM '98. Seventeenth Annual Joint Conference of the IEEE Computer and Communications Societies. Proceedings. IEEE (vol. 2)*, (Mar. 29 - Apr. 2, 1998), pp. 720-727.

Razavi, et al., "Optimizing the Tradeoff between Signaling and Reconfiguration: A Novel Bi-Criteria Solution Approach for Revising Tracking Area Design", *IEEE*, (2009), 5 pages.

Scourias, et al., "Dynamic Location Management and Activity-based Mobility Modelling for Cellular Networks", *University of Waterloo Thesis*, (1997), 145 pages.

* cited by examiner

TRACKING USER TERMINALS IN A MOBILE COMMUNICATION NETWORK

CROSS-REFERENCE TO RELATED APPLICATIONS

This application is a National stage of International Application No. PCT/EP2011/060090, filed Jun. 17, 2011, which is hereby incorporated by reference.

TECHNICAL FIELD

The invention relates to the field of tracking users in a mobile communication network.

BACKGROUND

A user terminal may be any kind of terminal by which a user accesses a communication network. Examples of a user terminal include a cellular phone, personal digital assistant, palmtop, laptop, desktop, gaming equipment, media player, sensor, and so on. Note that some types of communication network, such as 3GPP networks, primarily keep track of user subscriptions rather than user terminals, although user terminals are associated with subscriptions through UICC/SIM cards.

Geographical areas served by Public Land Mobile Networks (PLMNs) are typically partitioned into mobility areas (MAs) which may be referred to as, e.g., location areas (LAs), routing areas (RAs) or tracking areas (TAs). An MA consists of one or more cell radio coverage areas and a set of MAs managed by one or more nodes is known as the service area (SA) of this node or these nodes. The purpose of these areas is to keep approximate track of the whereabouts of user terminals.

The design of these MAs requires a trade off between the need for position updating (i.e., user terminals updating networks about changes in their MA) and user paging (i.e., networks locating user terminals inside their MA when there is incoming traffic). The larger the MA, the fewer resources are required for updating (large MAs mean that users have a smaller chance of crossing an area boundary to another MA) but the more resources are required for paging (a large area means that a user must be paged in more cells).

The second and third generations of mobile systems (2G and 3G, also referred to as GSM and WCDMA respectively) use a "double" partitioning; LAs for circuit switched services and RAs for packet switched services. Mobile Switching Centres (MSCs), which manage circuit switched traffic, keep track of the LAs of all user terminals in their respective SAs while Serving GPRS Service Nodes (SGSNs), which manage packet switched traffic, keep track of the RAs of all user terminals in their respective SAs. A problem with this solution is that it is inflexible in the sense that all users, irrespective of how mobile they are, must be handled in the same way. This means, for example, that those users who do not move at all must be unnecessarily paged in large areas and/or those users who move quickly between areas must update their LAs and RAs continuously.

The fourth generation of mobile systems (4G, also referred to as Long Term Evolution, LTE), which only handles packet switched traffic, uses single partitioning into TAs. Mobility Management Entities (MMEs) keep track of the TAs of all user terminals in their respective SAs. TAs are identified by numbers (TAIs) and collections of TAIs are known as TAI lists. TAI lists, which can amount to at most 16 TAs, are assigned by MMEs and increase the flexibility compared to 2G and 3G, as user terminals can be assigned TAI lists, and thus be registered in multiple TAs. The scope of TAI lists is limited to the TAIs of a specific MME SA LTE user terminals can be described as state machines with mobility states EMM-DEREGISTERED and EMM-REGISTERED and connection states ECM-IDLE and ECM-CONNECTED. In this simplified view, a user terminal becomes EMM-REGISTERED as it is switched on, EMM-REGISTERED and ECM-IDLE when an Access Point Name (APN) is established, and EMM-REGISTERED and ECM-CONNECTED when actually transmitting or receiving data.

Inside an MME SA, the whereabouts of user terminals in ECM-IDLE are recorded to the level specified by the TAI while the whereabouts of user terminals in ECM-CONNECTED are recorded to the cell level. To this end, all cells repeatedly broadcast their TAIs and user terminals continuously tune in to the cell that currently has the strongest signal. A user terminal will perform a TA update (TAU), i.e., report its location to the MME, if it cannot find the broadcast TAI in its TAI list, or its periodic inactivity timer expires. Note that for user terminals that are ECM-connected, the network knows the cell in which the user terminal is located, while for users that are ECM-idle the network only knows that the user terminal is in a TA of their TAI list (and, in addition, it will be known in which cell the terminal was last active).

Although the notation of TAI lists in 4G introduces a degree of flexibility compared to the rigid LAs and RAs in 2G and 3G, it does not solve the problem of optimising the trade-off between MA reporting and user terminal paging. On the contrary, "replacing" LAs and RAs by TAs may be considered to be simply a matter of terminology.

The concept of a TAI list has not arisen before 4G proposals, and although some similar concepts have been used in 2G and 3G networks, such concepts would require manual and labour intensive configuration of TAI lists. The use of such, largely non-overlapping, TAI lists would also mean that the problems with high control traffic overhead at TA borders remain. Furthermore, such lists and paging sequences would, in changing network conditions, lead to inefficient paging strategies that unnecessarily use a lot of signalling, increasing paging traffic overhead and localisation times.

SUMMARY

The inventors have realised the problems associated with the prior art solutions, and have devised a new method of tracking users in a mobile communication network that can be used to create more efficient paging sequences and more up to date TAI lists that better reflect changing network conditions.

According to a first aspect, there is provided a method of tracking user terminals in a mobile communication network. A tracking node determines that a user terminal is located in a tracking area and stores data associated with the tracking area. The data associated with the tracking area that is stored by the tracking node comprises a number of observations of all user terminals at the tracking area at a first time. The tracking node then receives a page response from the user terminal located in one of the tracking area and a further tracking area. In the event that the user terminal has remained located at the tracking area, then the tracking node updates the data to include the number of page responses received at the tracking area after a first time interval. In the event that the user terminal is now located at the further tracking area, the tracking node updates the data to include the number of page responses received at the further tracking area after the first time interval.

The tracking node may determine that a user terminal is located in a tracking area by any of receiving a page response from the user terminal and being notified of a communication session in which the user terminal is participating.

The method may further comprise storing additional data associated with one or more other tracking areas in which the user terminal has previously been located, the data comprising a number of observations of all user terminals in each of the one or more other tracking areas. Following receipt of a page response from the user terminal located in one of the tracking area and the further tracking area, in the event that the user terminal is located at the tracking area, updating the additional data to include the number of page responses received at the tracking area after a first time interval, and in the event that the user terminal is located at the further tracking area, updating the additional data to include the number of page responses received at the further tracking area after the first time interval.

The method may further comprise, in the event that the user terminal is located at the further tracking area, storing data associated with the further tracking area, the data associated with the further tracking area comprising a number of observations of all user terminals at the further tracking area, and updating a number of page responses received at the further tracking area after the first time interval.

The method may further comprise determining a paging list for paging user terminals, the paging list being determined on the basis of the tracking areas in which a user terminal is most likely to be located after the first time interval. The determination of the paging list may be made on the basis of a threshold of any of a number of user terminal page responses in a tracking area and a proportion of user terminal page responses in a tracking area.

The method may further comprise preparing a tracking area list by determining a list of tracking areas in which a user terminal is likely to be located after the first time interval. The determination of a list of tracking areas may be made using any of all data over a plurality of time intervals, a maximum number of page responses in a tracking area over a plurality of time intervals and a number of page responses in a tracking area for a specified time interval.

The method may further comprise preparing the tracking list by using additional data relating to user terminal movement. The additional data may comprise any of registration data, handover data, user terminal subscription data, and user terminal history data.

The tracking node may be selected from any of a base station, a Mobility Management Entity, a NodeB and an eNodeB.

According to a second aspect, there is provided a tracking node for use in a mobile communication network. The tracking node comprises:
  a first processor for determining that a user terminal is located in a tracking area;
  a computer readable medium in the form of a memory for storing data associated with the tracking area, the data comprising a number of pages received from all users at the tracking area at a first time;
  a receiver for receiving a page response from the user terminal, the user terminal being located in one of the tracking area and a further tracking area; and
  a second processor for, in the event that the user terminal remains located in the tracking area, updating the data to include the number of pages received at the tracking area after a first time interval, and in the event that the user terminal is located in the further tracking area, updating the data to include the number of pages received in the further tracking area after the first time interval.

The second processor may be further arranged to, in the event that the user terminal is located at the further tracking area, store data associated with the further tracking area, the data associated with the further tracking area comprising a number of observations of all user terminals at the further tracking area, and updating a number of page responses received at the further tracking area after the first time interval.

The tracking node may further comprise a second receiver for receiving information selected from any of a page from the user terminal and a notification that the user terminal is participating in a communication session, the information being usable by the first processor for determining that the user terminal is located in the tracking area.

The tracking node may further comprise a third processor arranged to determine a paging list for paging user terminals, the paging list being determined on the basis of the tracking areas in which the user terminal is most likely to be located after the first time interval. The third processor may be arranged to make the determination on the basis of a threshold of any of a number of user terminal page responses in a tracking area and a proportion of user terminal page responses in a tracking area.

The tracking node may further comprise a fourth processor for preparing a tracking list by determining a list of tracking areas in which a user terminal is likely to be located after the first time interval. The fourth processor may be arranged to make the determination for preparing the tracking list using any of all data over a plurality of time intervals, a maximum number of pages in a tracking area over a plurality of time intervals and a number of pages in a tracking area for a specified time interval.

The fourth processor may be arranged to prepare the tracking list is prepared by using additional data relating to user terminal movement. The fourth processor may be arranged to use additional data comprising any of registration data, handover data, user terminal subscription data, and user terminal history data.

According to a third aspect, there is provided a computer program comprising computer readable code which, when run on a tracking node, causes the tracking node to perform the method of the first aspect.

According to a fourth aspect, there is provided a computer program product comprising a computer readable medium and a computer program according to the third aspect, wherein the computer program is stored on the computer readable medium.

DETAILED DESCRIPTION

The invention generally pertains to mobile cellular networks and the localisation of idle user equipment. According to an embodiment of the invention, a tracking node such as a Base Station, a NodeB, an eNodeB or a Mobility Management Entity (MME) tracks users in specific areas. The mobility pattern data obtained by tracking users can be used to create TAI lists such that the need for updates is reduced when a terminal moves from one area to another, and to improve the efficiency of paging sequences.

The invention estimates mobility pattern statistics based on successful localisations of user terminals. Note, however, that other mobility statistics may also be used, such as registration, handover and regular TAUs.

Figure 1:
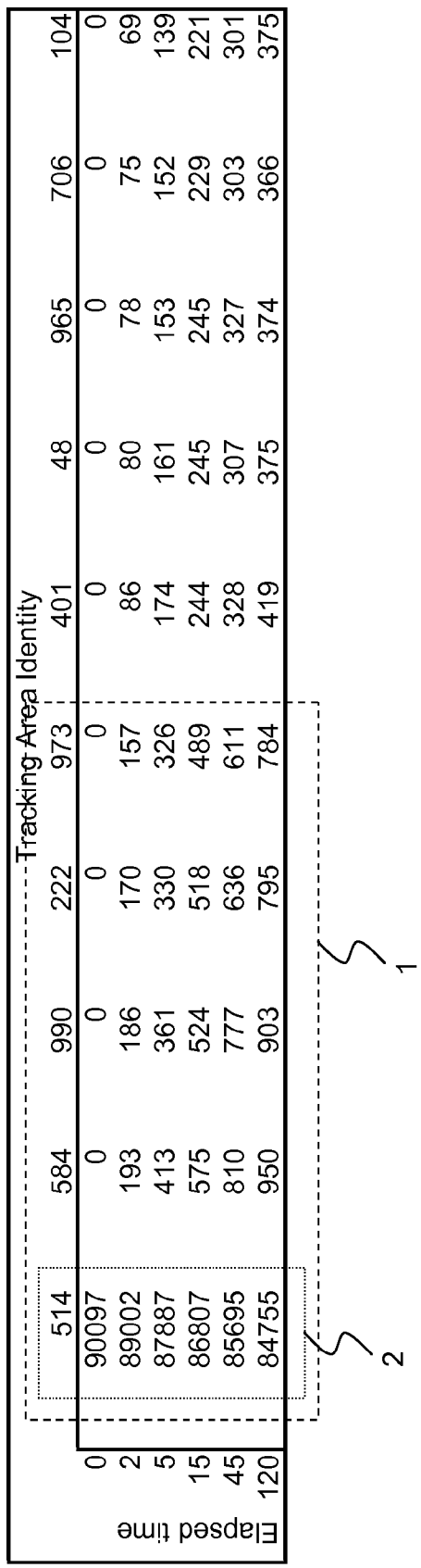
FIG. 1 is a table showing an exemplary statistics matrix according to an embodiment of the invention.

FIG. 1 shows an exemplary way in which the data can be handled by considering it in a matrix form. Each row in the matrix corresponds to a time interval up to the length of the periodic TA update (TAU) interval. In this example, with a TAU interval of 2 hours, the matrix has rows corresponding to 2, 5, 15, 45 and 120 minutes.

Each column in the matrix corresponds to a Tracking Area (TA) and the matrix at a TAI T has one column for T and other columns for the all TAs (or the most common TAs) to which users can move within the periodic TAU interval.

Note that while the description refers to Tracking Areas, this term can be used to refer to any sort of area in which a user terminal may move, for example cells, groups of cells, 4G Tracking Areas and so on. The invention is not limited to 4G Tracking Areas.

At time t, a user terminal makes contact with the network (for example, through a TAU) in a TAI. In the example of FIG. 1, the user terminal makes contact with TA 514. The user terminal is assigned the present TAI list for TA 514, and a time log is set to t. At a later time t', the same user again makes contact with the network in TAI T'. The elapsed time t'−t and the new TAI T' is noted. The element corresponding to row t'−t and column T' of the matrix at T is incremented. For example, if at time 15 minutes, the user terminal moves to TA 584, then the value stored at TA 584 at 15 minutes is increased by one.

Tracking user terminals in this was allows the tracking node to derive optimal TAI lists by collecting the TAs (columns) with the largest number of observations, and optimal paging schemes that simply page according to the statistics in column corresponding to the time elapsed since the TAI list was allocated.

The TAI list typically contains all TAs with a probability larger than some threshold $\epsilon$ and/or up to a maximum size. The paging scheme typically pages in rounds which are applied successively until an answer is received. In the first round, a page is performed in the most likely TAs, in the second round a page is performed (or also performed) in less likely TAs, and so on.

User terminals are assigned new TAI lists each time they make contact with the network (although in some embodiments it can be less frequent). Note that even if a new TA is the same as the old TA, the TAI list may have changed between t and t', and so it is necessary to maintain paging schemes for all TAI lists in current use.

Considering FIG. 1 in more detail, it can be seen that the neighbours of TA 514 (to which user terminals tend to move within two hours) are TAs 584, 990, 222, 973, 401, 48, 965, 706 and 104.

The dashed rectangle denotes a possible TAI list 1 for TA 514. In this example, the TAI list 1 contains TA 514, 584, 990, 222 and 973. These are the TAs that the user terminal is most likely to move to in the 2 hour time period. The user is therefore provided with this list. It can be seen that the possibility of a user moving to a TA that is not in the TAI list 1 (and therefore requiring a TAU to be performed) is (419+375+374+366+375)/90097=2.1%. In other words, using the data to prepare an optimized TAI list results in very few TAUs.

Considering now paging strategies, an exemplary two-round paging strategy is to perform a primary page in TA 514, and a secondary page in TA 584, 990, 222 and 973 when 15 minutes or less has passed since the TAI list was assigned. When more than 15 minutes have passed since the list was assigned, a primary page is performed in TAs 514, 584, 990, 222 and 973. Using this strategy, it can be estimated that the probability of not doing a secondary page within the first two minutes is 89002/(89002+193+ . . . +157)=99.2%. This means that rather than sending five pages (corresponding to the five TAs) in one paging round, the number of pages/rounds amounts to 1.02/1.008 (0-2 minutes), 1.05/1.016 (2-5 minutes) and 1.07/1.024 (5-15 minutes). This scheme saves approximately 80% of the paging attempts at the cost of a 1% more paging rounds.

Furthermore, the invention allows dynamically assigned TAI lists to take over the role of static TAs. A simple scheme is to allow each cell, tower, installation or site to be its own TA and use the dynamically acquired data and algorithms to minimise both TAUs and pages. This not only simplifies the administrative work but also enables solutions with high precision TAI lists and paging schemes (in theory down to cell level). Network administrators no longer need to manually configure TAI lists, nor do TAI lists require updating in response to changes in the network or its usage. Current restrictions on the length of a TAI list in LTE networks necessitate a grouping of individual cells into TAs in order to achieve dynamically assigned TAI lists of comparable size to today's mobility areas in terms of number of cells, but this restriction could be removed in future standards. Optimal page sequences can still be calculated on cell level within the TAI-list. In short, the use of tracking data described above leads to a significant reduction in the manual labour required to configure and maintain the network, while allowing for high precision user paging.

Furthermore, by continuously observing user terminal movement patterns, forgetting old patterns, and updating the statistics matrix, we can increase paging precision when network conditions or usage patterns change. As a simple example, consider again the statistics matrix in FIG. 1 and assume that travel patterns change and only a few user terminals move to TA 990. For the example two-round paging strategy example given above where TAs 514, 584, 990, 222, and 973 are paged in the first round, the use of an updated statistics matrix would effectively result in a new paging strategy excluding TA 990. This means that only four pages are performed in the first stage, while five pages would be used if the statistics had not been adapted. In short, continuously adapting the statistics matrix results in a lower expected number of pages with the same or lower expected paging time.

When the user terminal moves outside of the set of TAs identified in its assigned TAI list, it re-registers with the network and receives a new TAI list corresponding to the current local neighbourhood of the cell it registers at, in accordance with normal location management.

Figure 2:
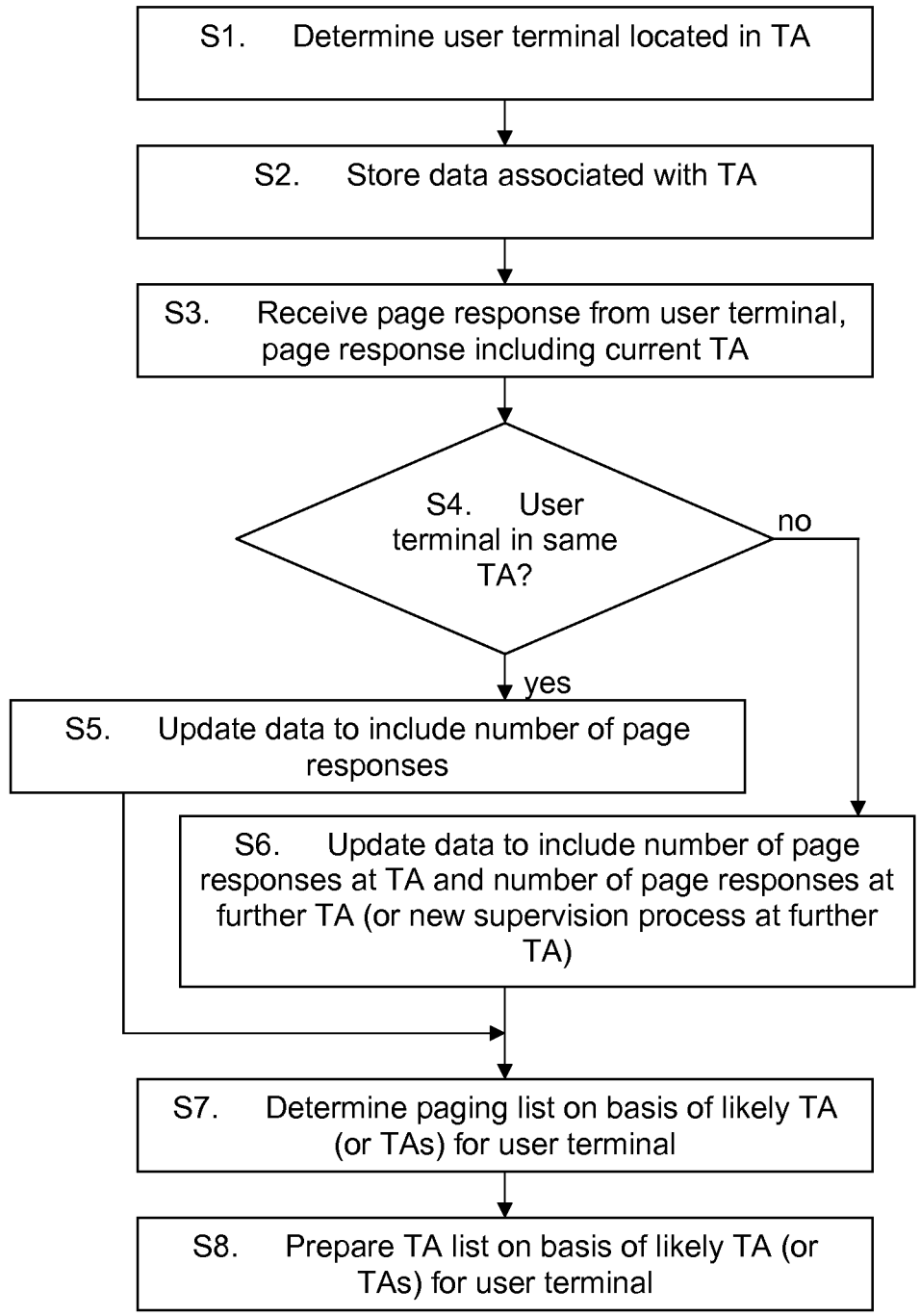
FIG. 2 is a flow chart showing steps according to an embodiment of the invention.

FIG. 2 is a flow diagram summarizing the above steps, with the following numbering corresponding to that of FIG. 2:

S1. A tracking node, such as an MME or a NodeB, determines that a user terminal is located in a TA. This may be done by, for example, receiving a page response from the user terminal or by receiving notification that the user terminal is involved in a communication session (such as sending/receiving an SMS message, participating in a call, sending/receiving data etc.)

S2. Data associated with the tracking area is stored. The data includes a number of page responses received from all terminals in the tracking area. A "supervision" of the user terminal is started to monitor the location of the user terminal, wherein the term supervision refers to the monitoring of page responses. This supervision process can continue for the duration of the periodic TA update (TAU) interval.

S3. The tracking node subsequently receives a page response from the user terminal.

S4. A determination is made to check whether the user terminal is in the same tracking area in which it was originally located.

S5. If the user terminal remains in the same tracking area, the data relating to that tracking area is updated to include the number of page responses received in that area after a first time interval. A new supervision process is also started, whilst the existing supervision is also continued. In addition, if any other supervision processes for the user terminal are currently active, in either the current tracking area or any previous tracking area, then all of these supervision processes update the number of page response received in the current tracking area after a time interval given by the starting time of the relevant supervision process and the time of the page response. In other words, the page response propagates backwards to all TAs where supervision processes for the user terminal are active, such that it is recorded by all supervision processes that have started previously and that have not yet finished.

S6. If the user terminal has moved to a further tracking area, the data relating to the tracking area in which the user terminal was previously located is updated to include the number of page responses received in the further tracking area after the first time interval. If a supervision of the user is also active in the further tracking area, then the data relating to the further tracking area is updated to include the number of page responses received at the further tracking area after the first time interval. Again, if any other supervision processes for the user terminal are currently active then all of these supervision processes update the number of page response received in the further tracking area after a time interval given by the starting time of the relevant supervision process and the time of the page response. In addition, a new supervision process is started in the further tracking area, whilst any existing supervisions are also continued. These supervision processes require that observations of users within the previous tracking area and any further tracking area are obtained by, for example, measuring page responses or determining that user terminals are involved in a communication session such as a voice call, SMS, data transfer etc. A supervision process "subscribes" to this information for as long as it is active.

S7. A paging list may be determined on the basis of the tracking area (or group of tacking areas) to which a user terminal is most likely to have moved after the first time interval. This may be made, for example, on the basis of a threshold of a number of user terminal responses in a TA, or a proportion of user terminal responses in a TA.

S8. The data may also be used to prepare a TA list that can be provided to user terminals. The TA list may be prepared on the basis of TAs to which a user terminal is most likely to have moved after the first time interval. The list may be prepared using data over a plurality of time intervals, a maximum number of page responses in a tracking area over a plurality of time intervals, or a number of page responses in a tracking area during a specified time interval. Other information, such as additional data relating to user terminal movement, may also be used to prepare the list. Examples of such additional data include registration data, handover data, user terminal subscription data, and user terminal history data.

As described above, when a tracking node receives a page response, the data corresponding to the time that has passed since a supervision started and the tracking area (TAI) in which the response was received is updated. In addition, a new supervision will start in the tracking area in which the response was received. Therefore, several supervisions of a user can be running concurrently in a tracking area, but with different starting times, and a user can be supervised in multiple tracking areas. Supervisions are initiated when users make themselves noted (in the TAI in which this happens) and they are terminated after a timeout typically corresponding to the time of a periodic TAU (P-TAU). This means that each page response may be counted multiple times in each tracking area (if the user has made himself known more than once in the last P-TAU time interval) and in multiple tracking areas (if the user has made himself known in multiple TAIs during the last P-TAU time interval). Note that whilst new supervisions are trigged by all events in which the user makes himself known (e.g. page response as well as outbound calls or SMSs), these supervisions are typically only interested in monitoring one such event (i.e. page responses).

The information that a page response has been received at an area T at a time t is propagated "backwards" to all other supervision processes which may be in progress for the user terminal. All such processes will then update their counters for the tracking area (e.g. in the appropriate column in the matrix) in which the response was received, but for different time intervals (e.g. in the appropriate row in the matrix). In this regard, the intervals depend on the starting times of the supervision processes. For example, for S supervision processes with starting times $t_1, \ldots, t_S$ (at T TAs where T is independent of S) will thus update the rows corresponding to $t-t_1, \ldots, t-t_S$ respectively. The number of TAs T to which the information relates generally amounts to all TAs in which the user has been active for the last P-TAU time units, and the number of supervision processes S typically amounts to the number of activities performed (times the user has made himself known to the network) during this time.

A page response therefore starts a new supervision process in the TA where it occurs, and causes the (previous) most recent supervision to update its counter. Note that the newly started supervision process will not update any counter until the next page response occurs. The supervision must then report back to the previously started supervision about the TA and the time, and this backward propagation of information is continued recursively until all active supervisions have been updated. Each supervision updated by such a message will typically have a different starting time (but some may have been started in the same TA). All of these supervisions will then update the column corresponding to the TA in which the response was received, but the row that is updated will depend upon the difference between the time of the page response and the specific starting time of that supervision. In addition, supervision processes are not only started by page responses, but also on all other occasions on which the user makes himself known to the network.

Figure 3A:
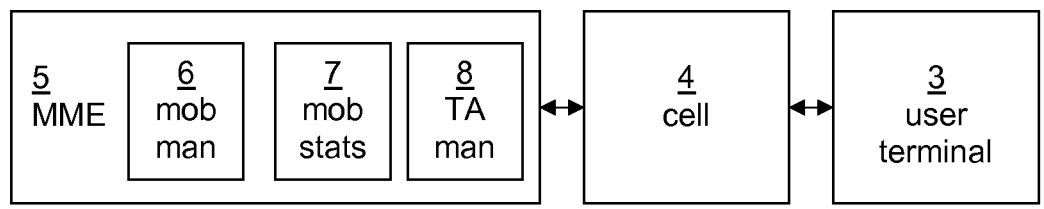
FIG. 3 illustrates schematically in a block diagram implementation options in a communication network.
Figure 3B:
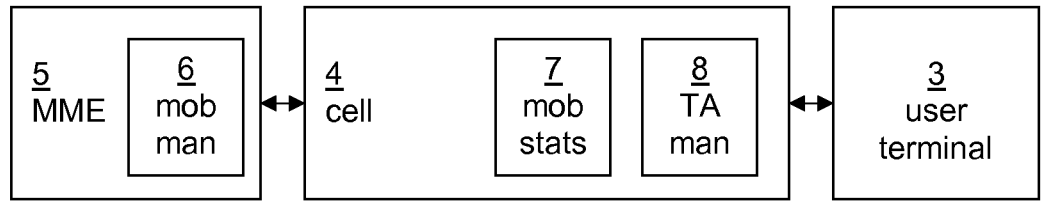

The mechanisms required to collect mobility statistics, assign local neighborhoods, and perform paging can be implemented either in a centralised or decentralised manner. In a centralised approach, mobility management, mobility statistics collection, and dynamic TA management would, for LTE networks typically reside in the MME. In the decentralised approach, statistics collection and TA management may be managed by each cell/base station on its own. FIG. 3 illustrates the difference between the centralized and decentralized approach; in FIG. 3A, a user terminal 3 connects via a cell 4 to an MME 5 which controls mobility management 6, and stores the mobility statistics 7 and controls dynamic TA management 8. In FIG. 3B, it can be seen that the mobility statistics 7 and the dynamic TA management are controlled at the cell 4 level. While a centralised implementation is more straightforward, the decentralised approach is not vulnerable to a single point of failure and provides better support for self-configuration when adding or removing cells/base stations. Furthermore, the distributed implementation has the advantage of potentially being able to handle MAs spanning several MMEs.

The following description assumes primarily the decentralized approach illustrated in FIG. 3B. Note that although the smallest managing entity is referred to as a cell, this might in fact be a group of individual cells in a TAI, based on, for example, which site or group of sites they belong to. As mentioned earlier, such a grouping might be necessary due to current limitations on the maximum size of TAI lists. Note however that even if the dynamic neighbourhood represented by the TAI-lists in current versions of LTE may have to be formed by aggregates of cells, statistics can still be gathered on cell level and used for optimal partitioning the individual cells covered by a TAI-list into paging phases. The following description assumes, for the sake of clarity, that each TAI consists of a single cell and that no restriction on TAI-list size exists. The following description also assumes an LTE network by way of example, although it will be appreciated that the mechanisms may be adapted for use in other types of network.

Registration of a user terminal 3 at a cell 4 is performed as established in LTE networks, with the main difference being that the TAI list sent out to the user terminal with the registration acknowledgement is dynamically computed based on mobility statistics. Note that the TAI list could vary from user terminal to user terminal depending on, e.g., type of user terminal or class of subscription.

Registration at a cell 4 is initiated by a user terminal 3. This triggers the procedure shown in FIG. 4. A pointer to the cell where the user terminal was previously registered is stored. This is used for distributing mobility statistics in the network. The local neighbourhood is updated according to current mobility statistics as described below, and if there are no other registered user terminals that share the updated neighbourhood then an optimal paging sequence is calculated. This is performed in order to have page sequences available to incoming page requests, and done for each time interval since the last TAU of the user terminal. Finally, the local neighbourhood is sent to the user terminal as a TAI list.

Figure 5:
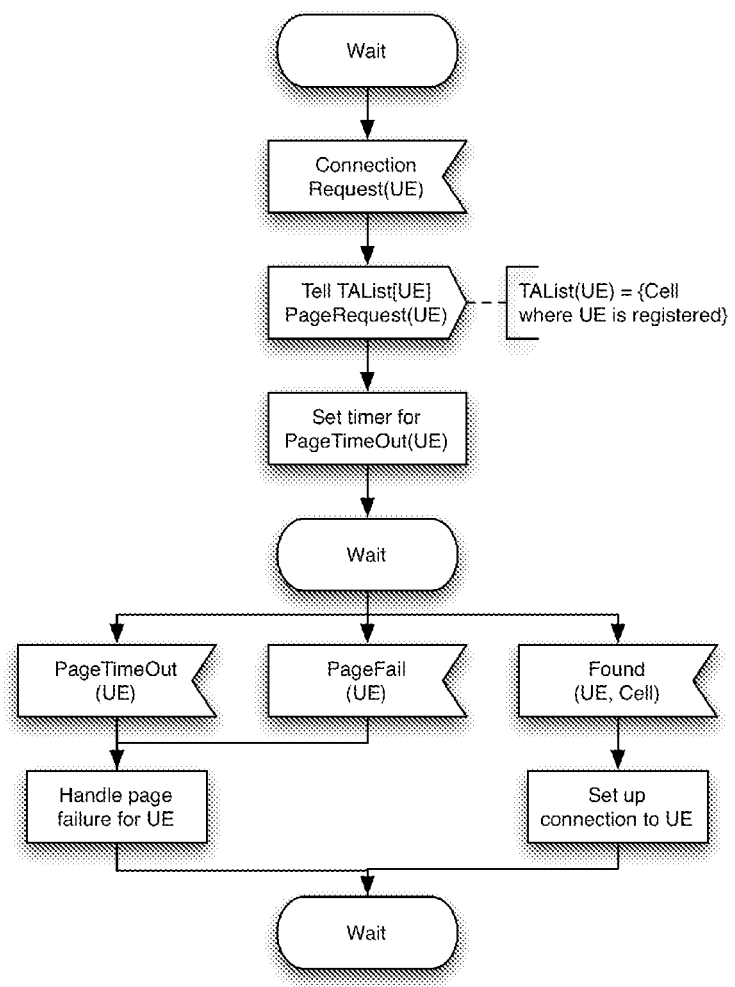
FIG. 5 is a flow diagram showing a procedure for paging a user terminal according to an embodiment of the invention.

When locating an idle user terminal, the primary paging procedure of the MME shown in FIG. 5 is triggered. This simply forwards the page request to the cell 4 where the user terminal 3 is currently registered, using a time out in case of network failure. When the timer expires or a page fail is reported, this is reported to the network, and if the user terminal 3 is located, a connection to the user terminal is set up.

Figure 6:
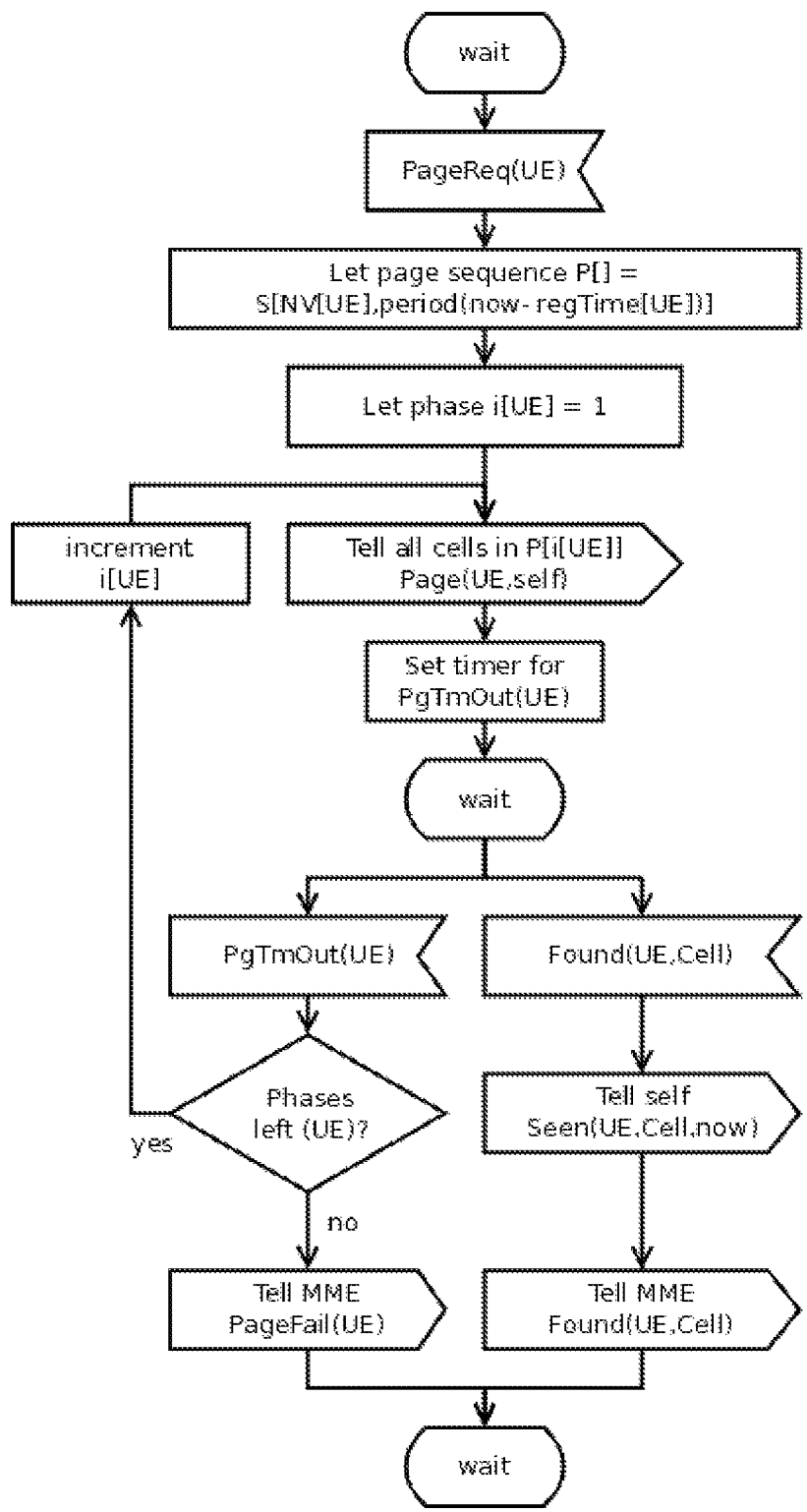
FIG. 6 is a flow diagram showing a procedure for paging a user terminal according to the cell in which it was last observed according to an embodiment of the invention.

FIG. 6 shows the paging request procedure within a cell. By using the statistics acquisition procedures described below, an optimal paging sequence based on mobility statistics suitable for this particular user terminal 3 has already been calculated. The procedure then uses the appropriate stored paging sequence to request paging for the user terminal 3 in all cells of each phase sequentially. If the user terminal 3 is found in a cell, the procedure is interrupted, the location reported to the network and a user terminal observation procedure described below is triggered. If all phases pass without locating the user terminal 3, a failed localisation is reported. The process of paging within a cell is performed as usual in LTE networks.

Figure 7:
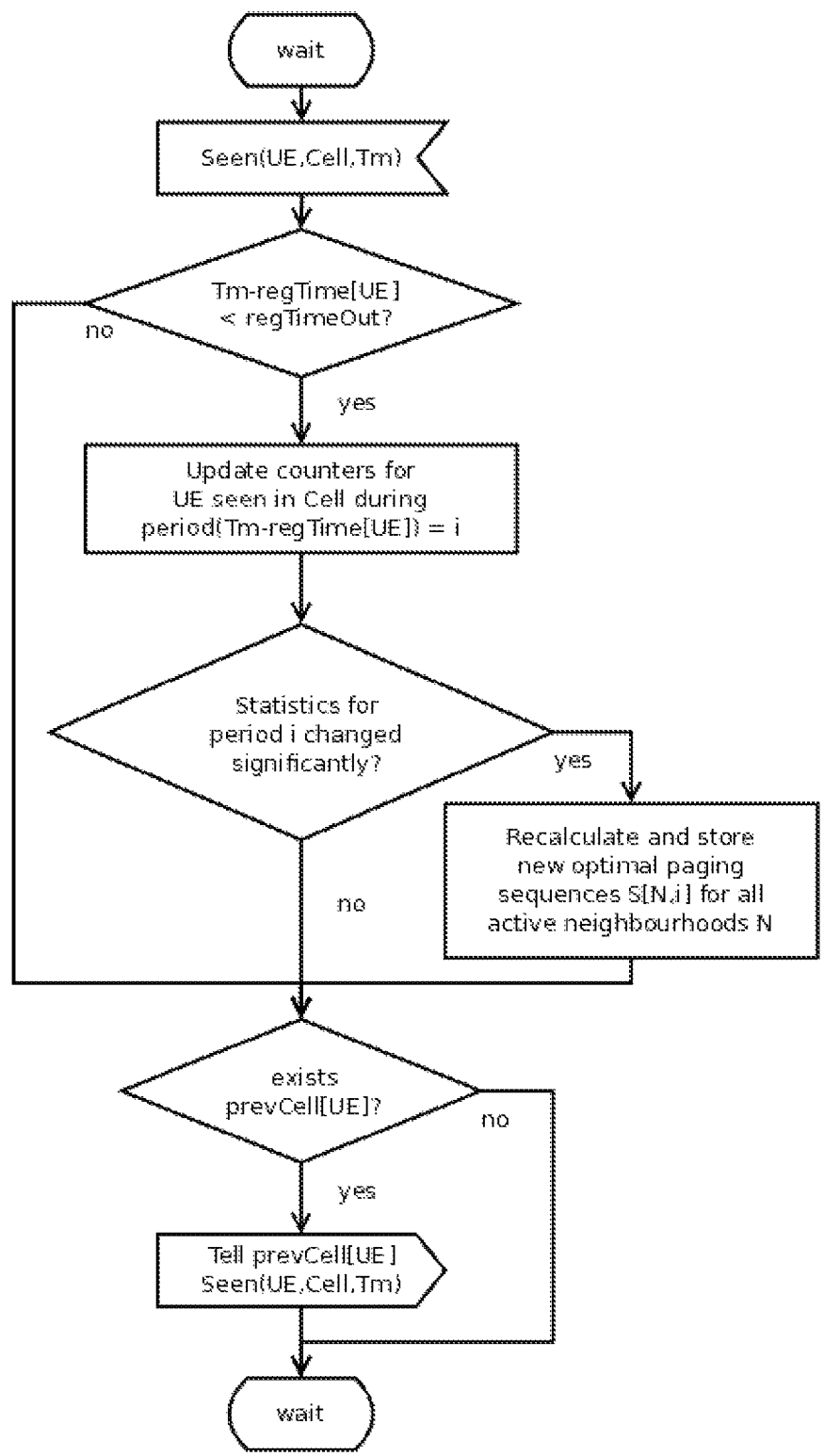
FIG. 7 is a flow diagram showing a procedure for gathering mobility data according to an embodiment of the invention.

Mobility statistics are gathered and distributed whenever a user terminal is successfully located, as illustrated in FIG. 7. If the time since registration falls within the registration time out for the user terminal 3, the counter for the cell where the user terminal is located is increased in the corresponding time slot. A comparison is made between the resulting distribution estimate and the distribution estimates used to calculate optimal paging sequences, and if necessary new paging sequences are calculated.

Note that each observation is forwarded to the cell 4 at which the user terminal 3 was previously registered, triggering the same observation procedure in this cell 4. Also note that the observation is forwarded even though the current cell may no longer update its own statistics. This allows each cell to maintain different and user terminal specific TAU intervals, and assures that observations of a user terminal 3 at a particular cell are registered in all cells the user terminal was previously registered at, within maximum time periods corresponding to the TAU intervals for these cells.

Figure 8:
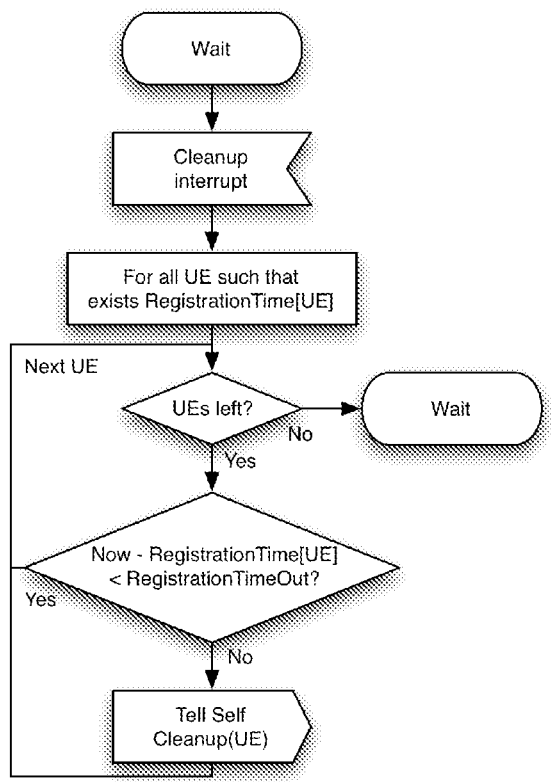
FIG. 8 is a flow diagram showing a procedure for determining whether to clean old data within a cell.
Figure 9:
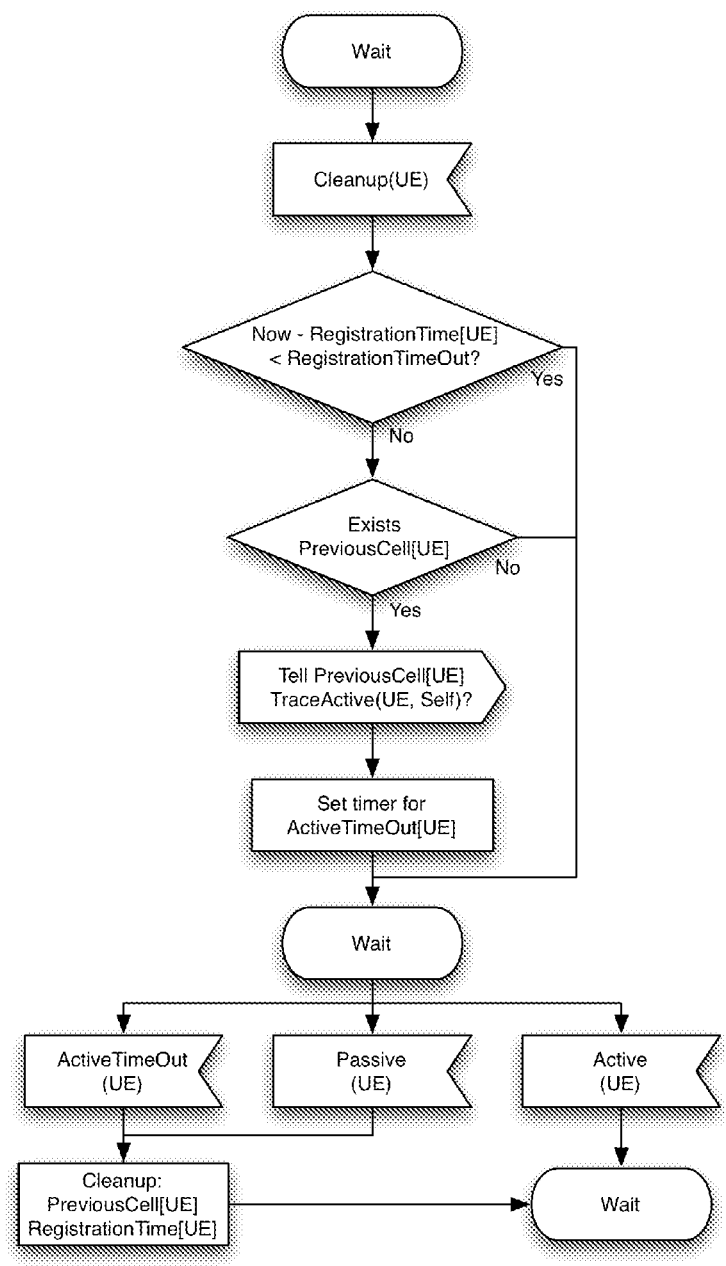
FIG. 9 is a flow diagram showing a procedure for cleaning old data within a cell.

The user terminal 3 mobility traces maintained by the above-described mechanisms, represented by the previous cell data recorded at each new registration for the user terminal 3 and TAI list based paging sequences, should be removed when they are no longer relevant in order to preserve memory, computational resources, and user integrity. The trace data is deleted from each cell 4 at regular intervals using a timer mechanism. This timer triggers the cleanup operation described in FIG. 8. This procedure iterates through all user terminals 3 for which a registration time is stored, and checks if registration time out has been reached. For all user terminals for which this is the case, the cleanup procedure shown in FIG. 9 is implemented. As the chain of previous registrations has to be maintained as long as there is at least one cell the user terminal 3 was previously registered at that is still interested in further observations, this procedure queries the previous cells before purging the link to previous cells for a user terminal 4.

Although the mechanism outlined above may be implemented centrally within an MME 5 by emulating the behaviour of each managed cell, the approach can be simplified to maintain counters and paging vectors for each individual cell in one array. Paging vectors are updated at the time of registration but are unique for each cell and user terminal TAI list. The paging mechanism itself is simplified by not having to forward the page request to individual cells, and instead the paging vector of the cell where the user terminal is registered can be retrieved and used directly by the MME 5. Similarly, the trace clean-up operations can be simplified since the information on which cells are still interested in observations of an individual user terminal 3 is directly available in the MME 5.

In order to prepare TAI lists and optimal paging sequences, a determination is made of the conditional user terminal 3 location distribution showing where and when the user terminal 3 was registered and other locally available data. The mechanisms for user mobility management and data collection presented below ensure that each cell is provided with information on where a previously registered user terminal 3 is located at the time of a page attempt, meaning that both first- and higher order Markov models of user mobility can be estimated (estimating the location distribution conditional on where the user terminal is registered and conditional on where the user terminal is and has been registered, respectively).

In an embodiment of the invention, a base model using a first order Markov approximation is chosen. To account for the fact that the distribution over cells typically is also highly dependent on the time since user terminal registration, this conditional is extended. The entropy of this distribution typically increases with time, as it becomes less certain where the user terminal is located when it has had longer time to move through the network. To simplify the representation and estimation of the conditional we introduce a number of fixed time intervals indexed by a variable l. These intervals are fixed, and can typically be set to e.g. 0-2, 2-5, 5-15 and 45-120 minutes. In practice, this means that we store and estimate one conditional for each time interval at each cell.

Figure 10:
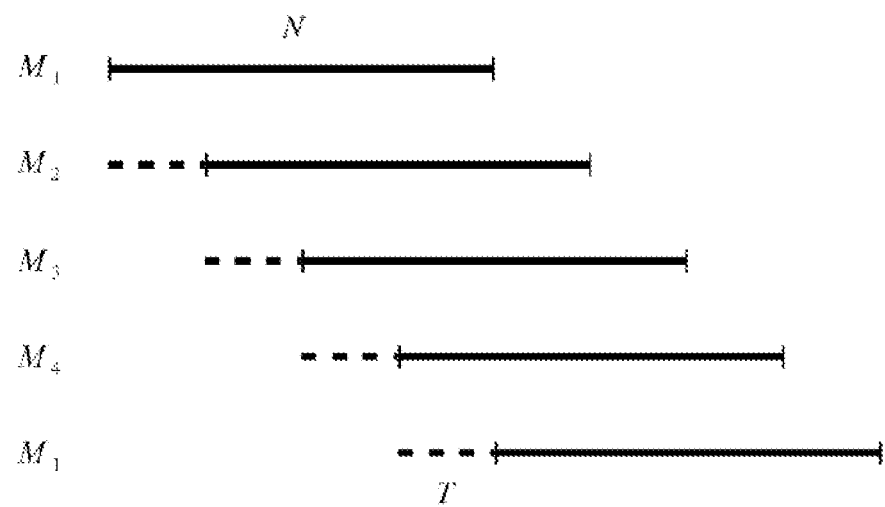
FIG. 10 illustrates schematically multiple overlapping estimators for the location distribution of a user terminal according to an embodiment of the invention.

Additionally, long-term development of usage and mobility patterns must be taken into account. This is managed by using multiple overlapping estimators Mη for the user terminal location distribution, using the latest complete model as prior to the next model. The estimation scheme is circular using M=N/T models, each based on N observations and degree of overlap T. The degree of overlap directly affects the temporal properties, i.e. how fast older historical data is forgotten. By using the previous model as a prior for the following model, a smooth transition between models is achieved while older mobility patterns have a smaller impact on the current parameter estimates, offering adaptation to new network regimes. Note that only M sets of counters need to be kept in memory at the same time, which means that we in a practical implementation circulate between M model representations as indicated in FIG. 10.

Using Bayesian inference where all probabilities are estimated using means over the posterior, we can write the ηth estimate of the probability that a user terminal is located at cell j given that it was last registered at cell i in time interval l as $$p_{ij}^{l\eta} = \frac{p_{ij}^{l(\eta-M)}\alpha + n_{ij}^{l\eta}}{\alpha + p_{ij}^{l\eta}} \quad (1)$$

where $p_{ij}^{l(\eta-M)}$ represents the previous estimate and $n_{ij}^{l\eta}$ the number of successful localisations of a user terminal to cell j during the time interval l since this user terminal was connected to cell i. α controls the equivalent sample size of the prior, i.e. how much we trust the prior compared to the new observations. Using a prior based on zero knowledge of the network topology, the initial estimate only includes the current cell and can be written as $$(\forall \eta < M)p_{ij}^{l\eta} = \begin{cases} 1 & i = j \\ 0 & i \neq j \end{cases} \quad (2)$$

Again, note that although in the expressions above model η increases infinitely, only M models and sets of counters need to be kept in memory at once.

For smoother transitions between estimates, a larger value of M can be used, but for all practical purposes M=2 should give adequate performance. For fast adaptation, N can be chosen to be in the order of about 200 samples, but can be set to a larger value if stability of the estimates is prioritised. One way to reduce the sensitivity to temporary fluctuations in mobility patterns is to set α=N.

To assign relevant, local TAI lists, an estimate of the mobility patterns within all possible time intervals is made as follows:

$$p_{ij}^{\eta} = \frac{p_{ij}^{(\eta-M)}\alpha + n_{ij}^{\eta}}{\alpha + p_{ij}^{\eta}} \quad (3)$$

Equation 3 is similar to Equation 1 for one time slot, using overlapping models in the same manner. Here, $p_{ij}^{(\eta-M)}$ represents the previous estimate and $n_{ij}^{\eta}$ the number of successful localisations of a user terminal to cell j during any time interval since this user terminal was connected to cell i, i.e. $n_{ij}^{\eta} = \Sigma_l n_{ij}^{l\eta}$.

Two parameters are used to control and limit the size of neighbourhoods created from this distribution estimate: A maximum size K, which cannot be exceeded, and a probability cut-off c, which sets a minimum conditional probability for being part of the neighbourhood. The neighbourhood/TAI list is then created by:
1. Sorting the 1-dimensional conditional probability vector over all cells given registration at the current cell.
2. Starting with the largest probability, adding all corresponding cells/TAs to the TAI list until K probabilities are reached, or probabilities fall under c.

Figure 4:
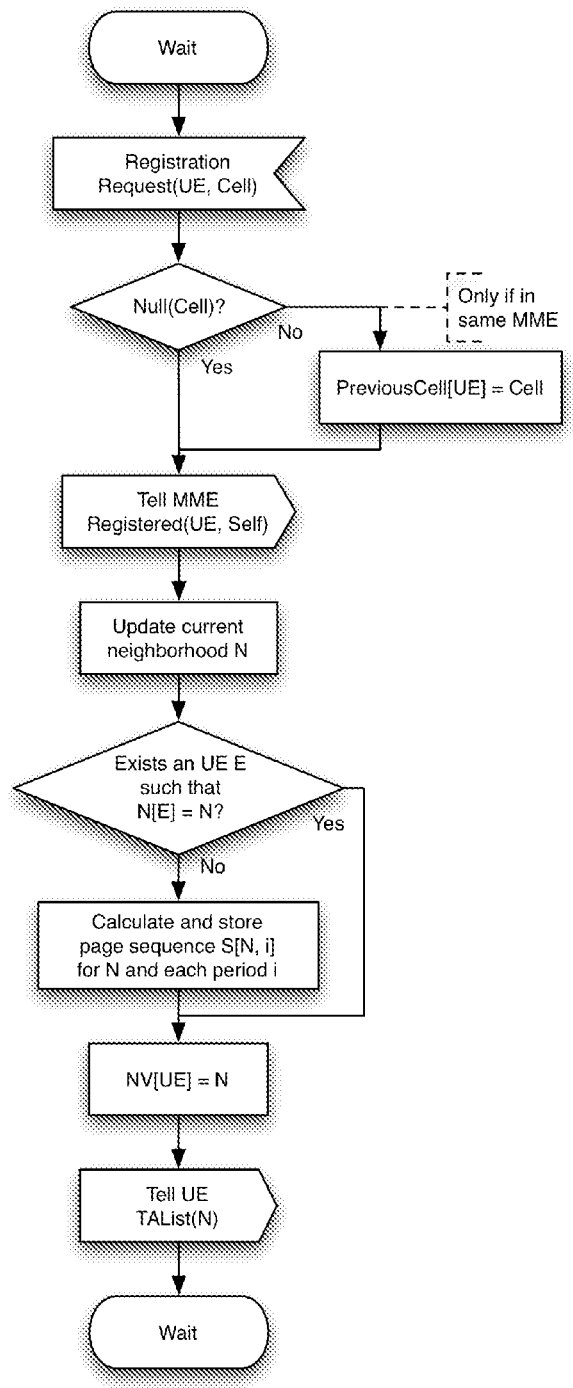
FIG. 4 is a flow diagram illustrating user terminal registration according to an embodiment of the invention.

This assignment is performed when a user terminal registers with a base station, as shown in FIG. 4.

The initial prior is as for each time slot above set to $$(\forall \eta < M)p_{ij}^{\eta} = \begin{cases} 1 & i = j \\ 0 & i \neq j \end{cases} \quad (4)$$

This prior leads to the expected behaviour for cell neighbourhood construction. The neighbourhoods initially only contain the current cell but gradually grow as more statistics are collected. However, if prior knowledge on network topology and mobility patterns is available, this could be encoded in the prior for even faster convergence.

As an alternative to using the collective statistics estimation of equation 3 as the basis of construction our TAI lists, TAI lists can be constructed in a similar manner for each time slot and then combined into a single TAI list to be sent to the user terminal. To do this, one could, for example, take the union of all TAI lists over all intervals, select a fixed number of TAs from each TAI list, or take the maximum over all intervals.

A possible extended approach to TAI list assignment is to create TAI lists as described above for each time slot. If the network and handset implementation would allow for multiple TAI lists with corresponding time slots, these could be sent directly to the handset that would switch between TAI lists according to the duration since its last TAU. This would allow for greater precision within user terminal location management. Alternatively, if as in LTE only one TAI list can be used, the union of the TAI lists corresponding to different time slots could be sent to the user terminal.

In user terminal mobility data, there are a number of other dependencies that may be exploited for a more exact user terminal location estimate. Most differences in user terminal location distribution are likely to be explained by the observed speed and direction of the user terminal. Therefore, by extending the first order Markov model described above to include earlier cells in which the user terminal has been registered, account can be made of user terminal mobility direction. By also conditioning the expression on the time between these earlier registrations, account can be made for the speed of the user terminal. As above, to simplify the representation and estimation of the conditional, a number of fixed time intervals can be introduced for these times.

The expressions above generalise directly to such representations. Note however that by extending the basic model, the necessary amount of observations for robust estimates and necessary memory requirements increases significantly.

Furthermore, other sources of statistics could be incorporated when estimating the user terminal location distribution. Readily available sources include re-registration observations for user terminals leaving one TA and registering in another one and handover observations for established connections. Such observations can be collected locally at each base station, propagating the information back along the constructed user terminal traces. However, note that both these types of observations have a sampling bias when compared to the user terminal location estimate we are interested in. For re-registration observations, the statistics will be heavily biased towards observations of base stations on the border of the TAI-list, while handover observations lack information on where incoming calls are probable and must be adjusted accordingly. One way to manage this is to use these statistics to form a prior to the user terminal location distribution along the same lines as when incorporating earlier models in equation 1.

If the operational states of cells are available, user terminal location distribution estimates can be extended to take this into account. The user terminal conditional location distribution given operational state of cells can based on the distribution over all cells estimated with a Laplace estimator from a zero sample set, i.e. a uniform distribution over all cells. If all cells are operational, the conditional will be uniformly distributed over all cells. If some cells are not operational, the probabilities of these cells are set to zero while using a uniform distribution over the operational ones. Independence between user terminal mobility history and operational state of the network is assumed, and thus the conditional user terminal distribution based on mobility patterns as estimated above and the conditional based on operational cells can simply be multiplied and re-normalised to arrive at the full conditional.

If network resources allow for it, individual user terminal usage history can be used at all or some locations in the network. If each cell can keep track of statistics for separate user terminals, these statistics could be used to increase the precision in the location distribution estimate. This would typically be performed by using the posterior collective user terminal pattern estimate described above as a prior for a user terminal specific distribution estimate in the same way as earlier models when using overlapping models. User terminal statistics could possibly also be collected at a central level, where the general location distribution of a certain user terminal is estimated and used in conjunction with cell local distribution estimates.

A mechanism to compute optimal paging sequences for each TAI list and subset of the TAU interval is employed within the paging scheme. This optimisation problem involves partitioning the TAs in the TAI list into a number of page phases so as to balance the cost for each individual page against the expected delay in localising the user terminal.

A known cost for delaying the page to a TA where the user terminal is actually located is assumed. Based on this, and the probability of a user terminal being in each TA, a cost can be calculated for paging the cells of any particular TA in a phase later than the first one. Based only on this cost it would always be optimal to page the cells of all the TAs in the TAI list in the first phase. However, if the cost is accounted for in terms of network load due to paging messages and weighed against the delay cost described above, a set partitioning optimisation problem arises as described below.

The cost of a paging sequence will therefore have two components, which need to be weighted against each other. First, the delay cost of an individual page will depend on the phase it is allocated to and the probability that it will be successful. In other words, the more likely a page is to succeed, the more expensive it will be to delay it. This component of the cost function can be expressed as:

$$C_{delay} = \sum_{1 \le j \le t} \sum_{0 \le k < m} w_k q_{jk} P_j \quad (5)$$

where t is the number of cells in the TAI-list, $w_k$ is a constant weight for the cost of delaying a page to phase k and k is the paging phase index. $q_{jk}$ is a boolean which takes the value 1 if cell j is paged in paging phase k. $P_j$ is the probability that the user terminal is in fact in cell j.

Since it is known that a user terminal will be paged exactly once in each TA of the TAI list, a contribution arises from exactly one phase. This cost typically grows with the phase index.

Secondly, a discounted paging cost for each page is used. This will for each page performed in any given phase, be expressed as one minus the sum of the probabilities of all pages done in earlier phases. Thus the cost of each page with the probability that it will not need to be performed is discounted.

This cost can be calculated as follows:

$$C_{page} = \sum_{0 \le k < m} t_k \left(1 - \sum_{0 \le r < k} \sum_{1 \le j \le t} q_{jr} P_j \right) \quad (6)$$

where the number of pages $t_k$ in each phase k is $$t_k = \sum_{1 \le j \le t} q_{jk} \quad (7)$$

That is, the more likely it is that the pages of an earlier phase were successful, the less costly we consider the pages of the current phase. As expressed above, the cost appears to be very non-local and difficult to evaluate point-wise, but it is possible to rewrite the discount so that the total cost becomes $$C_{tot} = C_{delay} + t - \sum_{1 \le j \le t} \left( \sum_{0 \le k < m} \sum_{0 \le r < k} \left( \sum_{1 \le j \le t} q_{jk} \right) q_{jr} P_j \right) \quad (8)$$

where t is the number of cells denoted by the TAI-list, and $q_{jr}$ are booleans that take the value 1 if cell j is paged in phase r.

Problems of this type can be solved to optimality using constraint-programming techniques for TAI list of size up to 80 base stations and 4 phases in a matter of a few seconds using basic computational hardware. By using integer-programming techniques or by interrupting the search for an optimal solution after a fixed maximum computation time, larger TAI lists can be handled, more phases can be handled, or the computation time spent on optimisation for each TAI list and time period can be reduced further.

For an optimal paging sequence to be available if a localisation request is made for a newly registered user terminal, the paging sequence is calculated when the user terminal registers at a cell if the TAI list is not already in use (see FIG. 4). As new user mobility observations arrive, mobility statistics and the optimal paging sequence may change. However, since the computational cost is still not insignificant, re-computation of the optimal paging sequence is delayed until these new observations make a significant impact on the outcome of the optimisation. For this the Kullback-Leibler divergence measure is employed between the distribution used for computing the stored paging sequences and that of the current estimated state as follows:

$$D_{KL}(P\|P^{prev}) = \sum p_j \log \frac{p_j}{p_j^{prev}} \qquad (9)$$

where P represents our current distribution estimate, $P_{prev}$ the estimate used for our current paging sequence, and j runs over all cells in the TAI list sent to the user terminal. New paging sequences for active TAI lists are computed only when a new observation increases the measure over a fixed limit (see FIG. 7).

Using the method described herein, it is possible to distinguish between paging strategies for different services or customer contracts. The paging mechanism can be controlled either through modifying the cost of call setup delay or the maximum length (and possibly cut-off limit) for the TAI list. For example, a customer with a premium subscription could use a higher cost of call setup delay or shorter TAI list as this will reduce the expected setup delay (at the cost of increasing the load on the network in terms of transmitted paging messages and/or TAUs).

A further extension is the use of the collected statistics to detect and report changes in collective user pattern behaviour. Using overlapping statistical models as described above, and comparing all consecutive models using the Kullback-Leibler divergence changes in user terminal behaviour can be detected and reported, either to network operators or to, for example, emergency services.

A series of experiments have been performed using an implementation of the method and a simulator module in order to verify the accuracy and scalability of the method. The experiments focused on the behaviour of nodes that are either single cells or base stations, and assumed that each TAI represents a single node with no restriction on TAI list size. The simulations are based on user terminals registering at a given node and are then observed exactly once at any of a given number of other nodes according to a given stationary probability distribution.

The distributions are designed to capture the dependence on distance from the registered node with two directions having a slightly higher probability than others as expected around e.g. a major road. For the sake of clarity we assume here that all of this happens with in one single time period.

The information gain, measured as the Kullback-Leibler divergence, between the distribution estimate built up inside the node where the user terminal is registered and the actual distribution used for sampling was found to converge for a sample set size of 127 cells. The error becomes insignificant after some 500 observations (incoming connections/paging events). This provides a reliable estimate of the actual distribution and can accurately calculate TAI-lists and optimal paging sequences.

As observations accumulate, the cell updates its local neighbourhood to include the nodes where its user terminals are most likely to be observed again. This means that as information about the actual distribution is built up, the neighbourhood first grows to a fixed maximum size and then fluctuates slightly as the estimate of the stationary distribution converges. The probability of encountering a new neighbourhood (of maximum size 64) was found to decrease from 1.0 to about 0.2 over a run of 999 observations. The probability of having to update the page sequence for a known neighbourhood also decreases.

A new neighbourhood is created only when a user terminal is registered and the current estimate of the distribution has changed enough. Each time a new neighbourhood is created, a paging sequence is calculated for that neighbourhood. In addition, every time the estimate of the distribution is updated, a check is made for each stored neighbourhood how much the new information diverges from the old and recalculate the page sequence if it is likely that it would result in a new one. It has been found that to ensure that the page sequence computation terminates within a few seconds, the neighbourhood size (the number of cells in the TAI-list) should be kept below around 60 for 4 phases and a few hundred for 3 phases. If the computational cost becomes too high for a particular setup, a decision can be made to recalculate only when the divergence increases above a higher threshold (sacrificing sensitivity to change), or switch to an approximating method for the page sequence computation.

To illustrate the type of gains that can be expected by implementing the proposed method, it has been observed that after around 750 observations, out of 64 cells in a TAI list, paging in 9 cells (first phase) will locate about 43% of the user terminals still associated with the current cell, while paging in 24 more cells (second phase) will locate about 66% of the user terminals. When assessing the expected number of pages in order to reach a randomly selected user terminal from the sample set, the expected number of pages for a random incoming call stabilises at around 26.5 (out of 64 maintained in the neighbourhood). This should be contrasted to a current common situation where we either succeed after single page (in 15.7% of the cases in our example) or after paging the whole static mobility area 64 nodes which would yield 53.3 expected number of pages. This means that the method described above achieves a reduction of 51% compared to current practice. For a two phase version of the proposed mechanism the improvement becomes 38% and with four phases 56%, although at that point the delay may become unacceptably large for a small portion of the connections.

Figure 11:
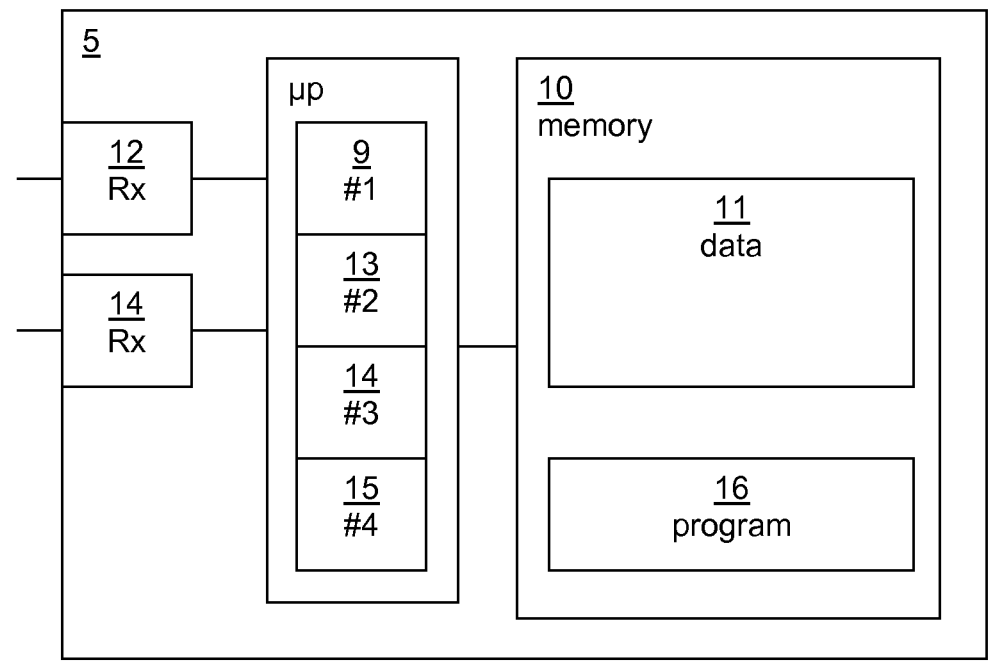
FIG. 11 illustrates schematically in a block diagram a tracking node according to an embodiment of the invention.

FIG. 11 illustrates schematically in a block diagram a tracking node according to an embodiment of the invention. In this example, the tracking node is a MME 5, but it will be appreciated that it may be a different node, particularly where the tracking node is located in a cell.

The MME 5 is provided with a first processing unit 9 that determines that the user terminal is located in a TA. This may be, for example, by receiving a page from the user terminal, or notification that the user terminal is involved in a communication session such as a voice call, sending or receiving an SMS or other data. A computer readable medium in the form of a memory 10 is provided for storing data 11 associated with the TA, the data comprising a number of pages received from all users at the TA at a first time. A first receiver 12 is provided for receiving a page response from the user terminal, the user terminal being located in either the TA or a further TA. A second processor 13 is also provided which, in the event that the user terminal remains located in the TA, updates the data to include the number of pages received at the TA after a first time interval. In addition, if any other supervision processes for the user terminal are currently active, in either the current tracking area or any previous tracking area, then the second processor 13 updates the data related to these active supervision processes to include the number of pages received at the TA after a time interval given by the starting time of the relevant supervision process and the time of the page response.

If the user terminal is located in the further TA, the second processor 13 updates the data of the previous TA to include the number of pages received in the further TA after the first time interval. The second processor 13 also updates the data related to any other active supervision processes to include the number of pages received at the TA after a time interval given by the starting time of the relevant supervision process and the time of the page response. For example, if a supervision of the user is active in the further tracking area, then the second processor 13 updates the data of the further TA to include the number of pages received in the further TA after the first time interval.

The MME 5 may also be provided with a second receiver 14 that receives information selected from any of a page from the user terminal and a notification that the user terminal is participating in a communication session, which information can be used by the first processor 9 for determining that the user terminal is located in the TA.

A third processor 14 may be provided to determine a paging list for paging user terminals. As described above, the paging list is determined on the basis of the tracking areas in which a terminal is most likely to be located after the first time interval. The third processor 14 can make the determination on the basis of a threshold of any of a number of user terminals in a TA and a proportion of user terminals in a TA.

A fourth processor 15 may be provided for preparing a tracking list by determining a list of TAs in which a user terminal is likely to be located after the first time interval. The fourth processor 15 can make the determination using any of all data over a plurality of time intervals, a maximum number of pages in a TA over a plurality of time intervals and a number of pages in a TA for a specified time interval, and may also make use of additional data relating to user terminal movement such as registration data, handover data, user terminal subscription data, and user terminal history data.

Note that while the processors are described separately above, it is simply the processing function that is described. It will be appreciated that the processing functions may all be handled by a single processor, as shown in FIG. 11.

The memory 10 may also be used to store a computer program 16 comprising computer readable code which, when run by the processor, causes the MME 5 (or other type of tracking node) to perform the actions described above.

The proposed mechanisms for network self-organisation and self-tuned TAI lists have several significant advantages as compared to current practices. Firstly, considerable reductions of costs for planning, configuring and maintaining the cellular network infrastructure can be achieved and, secondly, much more efficient use can be made of limited infrastructure resources.

The first type of advantage amounts to a significant reduction of the effort spent on planning, configuring, maintaining and reconfiguring non-overlapping mobility areas for a given installation. Since the proposed mechanism completely eliminates the need for static mobility areas from the localisation mechanism all the time spent on this type configuration can be discounted.

In terms of more efficient operations, the mechanism described herein significantly reduces the average number of pages per paging attempt as well as the number of location updates. The mechanism also automatically adapts to changes in mobility patterns and to the load of surrounding nodes in the network, and is resilient against faults and changes to the network infrastructure. The benefit of this is measurable not only in terms of number of pages and location updates, but also in terms of general robustness of the services against fluctuations in user patterns. Furthermore, the mobility area and paging sequence can be adapted to different kinds of users and services.

The mechanisms described herein provide a distributed, adaptive self-configuration of mobile access network infrastructure equipment, and can serve as a basis for extending network self-configuration functionality to other critical network parameters.

It will be appreciated by the person of skill in the art that various modifications may be made to the above-described embodiments without departing from the scope of the present invention as defined in the appended claims. For example, the above embodiments can be extended to any type of mobile network.

The following acronyms have been used in the above description:
APN Access Point Name
ECM EPS Connection Management
EMM EPS Mobility Management
EPS Evolved Packet System
GPRS General Packet Radio Service
GSM Global System for Mobile Communications
LA Location Area
LTE Long Term Evolution
MA Mobility Area
MME Mobility Management Entity
MSC Mobile Switching Centre
PLMN Public Land Mobile Network
RA Routing Area
SA Service Area
SGSN Serving GPRS Service Node
TA Tracking Area
TAI Tracking Area Identity
TAU Tracking Area Update
UE User Equipment
WCDMA Wideband Code Division Multiple Access
WIPO World Intellectual Property Organisation.

The invention claimed is:
1. A method of tracking user terminals in a mobile communication network, the method comprising:
determining, at a tracking node, that a user terminal is located in a first tracking area;
storing data associated with the first tracking area, the data associated with the first tracking area including a number of observations of all user terminals at the first tracking area for a plurality of time intervals;
receiving a page response from the user terminal located in one of the first tracking area and a second tracking area;

in an event that the user terminal remains located at the first tracking area, updating the data to include a number of page responses received at the first tracking area after a first time interval, and in an event that the use terminal is located at the second tracking area, updating the data to include a number of page responses received at the second tracking area after the first time interval;

storing additional data associated with one or more other tracking areas in which the user terminal has previously been located, the additional data including a number of observations of all user terminals in each of the one or more other tracking areas for a plurality of time intervals; and following receipt of a page response from the user terminal located in one of the first tracking area and the second tracking area, in the event that the user terminal is located at the first tracking area, updating the additional data to include the number of page responses received at the first tracking area after a first time interval, and in event that the user terminal is located at the second tracking area, updating the additional data to include the number of page responses received at the second tracking area after the first time interval.

2. The method according to claim 1, further comprising, in the event that the user terminal is located at the second tracking area, storing data associated with the second tracking area, the data associated with the second tracking area comprising a number of observations of all user terminals at the second tracking area, and updating a number of page responses received at the second tracking area after the first time interval.

3. The method according to claim 1, wherein the tracking node determines that a user terminal is located in a tracking area by one of receiving a page response from the user terminal and being notified of a communication session in which the user terminal is participating.

4. The method according to claim 1, further comprising:
determining a paging list for paging user terminals, the paging list being determined on the basis of tracking areas in which a user terminal is most likely to be located after the first time interval.

5. The method according to claim 4, wherein the determination of the paging list is made based on a threshold of one of a number of user terminal page responses in a tracking area and a proportion of user terminal page responses in a tracking area.

6. The method according to claim 1, further comprising:
preparing a tracking area list by determining a list of tracking areas in which a user terminal is likely to be located after the first time interval.

7. The method according to claim 6, wherein the determination of a list of tracking areas is made using one of all data over a plurality of time intervals, a maximum number of page responses in a tracking area over a plurality of time intervals, and a number of page responses in a tracking area for a specified time interval.

8. The method according to claim 6, further comprising preparing the tracking list by using additional data relating to user terminal movement.

9. The method according to claim 8, wherein the additional data comprises one of registration data, handover data, user terminal subscription data, and user terminal history data.

10. The method according to claim 1, wherein the tracking node is selected from one of a base station, a Mobility Management Entity, a NodeB, and an Evolved NodeB (eNodeB).

11. A tracking node for use in a mobile communication network, the tracking node comprising:
a first processor, arranged to determine that a user terminal is located in a first tracking area;
a non-transitory computer readable medium, arranged to store data associated with the first tracking area and additional data associated with one or more other tracking areas in which the user terminal has previously been located, the data including a number of pages received from all users at the first tracking area for a plurality of time intervals and the additional data including a number of pages received from all users at each of the one or more other tracking areas for a plurality of time intervals;
a receiver, arranged to receive a page response from the user terminal, the user terminal being located in one of the first tracking area and a second tracking area; and
a second processor, arranged to, in an event that the user terminal remains located in the first tracking area, update the data to include a number of pages received at the first tracking area after a first time interval, and in an event that the user terminal is located in the second tracking area, update the data to include a number of pages received in the second tracking area after the first time interval, the second processor further arranged to, following receipt of a page response from the user terminal located in one of the first tracking area and the second tracking area, in the event that the user terminal is located in the first tracking area, update the additional data to include the number of pages received at the first tracking area after a first time interval, and in the event that the user terminal is located in the second tracking area, update the additional data to include the number of pages received in the second tracking area after the first time interval.

12. The tracking node according to claim 11, wherein the second processor is further arranged to, in the event that the user terminal is located at the second tracking area, store data associated with the second tracking area, the data associated with the second tracking area comprising a number of observations of all user terminals at the second tracking area, and update a number of page responses received at the second tracking area after the first time interval.

13. The tracking node according to claim 11, further comprising a second receiver, arranged to receive information selected from one of a page from the user terminal and a notification that the user terminal is participating in a communication session, the information being usable by the first processor for determining that the user terminal is located in the first tracking area.

14. The tracking node according to claim 11, further comprising a third processor arranged to determine a paging list for paging user terminals, the paging list being determined on a basis of tracking areas in which the user terminal is most likely to be located after the first time interval.

15. The tracking node according to claim 14, wherein the third processor is arranged to make the determination based on a threshold of one of a number of user terminal page responses in a tracking area and a proportion of user terminal page responses in a tracking area.

16. The tracking node according to claim 11, further comprising a fourth processor, arranged to prepare a tracking list by determining a list of tracking areas in which a user terminal is likely to be located after the first time interval.

17. The tracking node according to claim 16, wherein the fourth processor is arranged to make the determination for preparing the tracking list using one of all data over a plurality of time intervals, a maximum number of pages in a tracking area over a plurality of time intervals, and a number of pages in a tracking area for a specified time interval.

18. The tracking node according to claim 16, wherein the fourth processor is arranged to prepare the tracking list by using additional data relating to user terminal movement.

19. The tracking node according to claim 18, wherein the fourth processor is arranged to use additional data comprising one of registration data, handover data, user terminal subscription data, and user terminal history data.

20. A non-transitory computer-readable medium having computer instructions stored therein, which when executed by a tracking node, cause the tracking node to perform operations comprising:
- determining that a user terminal is located in a first tracking area;
- storing data associated with the first tracking area, the data associated with the first tracking area including a number of observations of all user terminals at the first tracking area for a plurality of time intervals;
- receiving a page response from the user terminal located in one of the first tracking area and a second tracking area;
- in an event that the user terminal remains located at the first tracking area, updating the data to include a number of page responses received at the first tracking area after a first time interval, and in an event that the user terminal is located at the second tracking area, updating the data to include a number of page responses received at the second tracking area after the first time interval;
- storing additional data associated with one or more other tracking areas in which the user terminal has previously been located, the additional data including a number of observations of all user terminals in each of the one or more other tracking areas for a plurality of time intervals; and
- following receipt of a page response from the user terminal located in one of the first tracking area and the second tracking area, in the event that the user terminal is located at the first tracking area, updating the additional data to include the number of page responses received at the first tracking area after a first time interval, and in event that the user terminal is located at the second tracking area, updating the additional data to include the number of page responses received at the second tracking area after the first time interval.

* * * * *